United States Patent
Wang et al.

(10) Patent No.: US 9,148,655 B2
(45) Date of Patent: Sep. 29, 2015

(54) TESTING STRUCTURE, METHOD AND SYSTEM FOR TESTING SHUTTER GLASSES

(75) Inventors: Chih-Li Wang, New Taipei (TW); Ming-Jen Chan, New Taipei (TW); Yi-Cheng Lee, New Taipei (TW)

(73) Assignee: Wistron Corp., New Taipei (TW)

( * ) Notice: Subject to any disclaimer, the term of this patent is extended or adjusted under 35 U.S.C. 154(b) by 702 days.

(21) Appl. No.: 13/526,172

(22) Filed: Jun. 18, 2012

(65) Prior Publication Data
US 2013/0010090 A1     Jan. 10, 2013

(30) Foreign Application Priority Data
Jul. 5, 2011   (TW) .............................. 100123622 A (51) Int. Cl.
*H04N 13/02* (2006.01)
*H04N 13/04* (2006.01)
*H04N 17/04* (2006.01)

(52) U.S. Cl.
CPC ........... *H04N 13/0438* (2013.01); *H04N 17/04* (2013.01)

(58) Field of Classification Search
CPC .... H04N 17/00; H04N 17/04; H04N 13/0438
See application file for complete search history.

(56) References Cited

U.S. PATENT DOCUMENTS

| 6,775,637 B2 * | 8/2004 | Garcia ........................ 702/117 |
| 2011/0134231 A1 * | 6/2011 | Hulvey et al. .................. 348/56 |

FOREIGN PATENT DOCUMENTS

| TW | I229195 | 3/2005 |
| TW | M394470 | 12/2010 |

OTHER PUBLICATIONS

Taiwan Patent Office, Office Action, Patent Application Serial No. 100123622, Aug. 26, 2013, Taiwan.

* cited by examiner

*Primary Examiner* — Tung Vo
*Assistant Examiner* — Joseph Becker (57) ABSTRACT

A testing system including a preset display device, preset shutter glasses and a testing device is disclosed. The preset display device generates a synchronization signal and outputs a timing signal relating to the synchronization signal. The preset shutter glasses receive the synchronization signal to generate a masking signal. The testing device processes the timing signal and the masking signal according to a setting signal and determines whether the preset shutter glasses are normal according to the processed result.

17 Claims, 6 Drawing Sheets

TESTING STRUCTURE, METHOD AND SYSTEM FOR TESTING SHUTTER GLASSES

CROSS REFERENCE TO RELATED APPLICATIONS

This Application claims priority of Taiwan Patent Application No. 100123622, filed on Jul. 5, 2011, the entirety of which is incorporated by reference herein.

BACKGROUND OF THE DISCLOSURE

1. Field of the Disclosure

The disclosure relates to a testing structure, method and system, and more particularly to a testing structure, method and system for testing whether shutter glasses are normal.

2. Description of the Related Art

With technological development, the kinds of display devices have increased. The kinds of display devices are implemented in black and white televisions, color televisions and Ultra High Definition Televisions (UHDTV). Display devices provide natural and lifelike images. Among the display devices, a three dimensional (3D) display device provides a general image and color and also provides 3D space effects.

General three-dimensional (3D) displays are implemented with specific glasses to display 3D images. The specific glasses are divided into active type and passive type glasses. Typically, active glasses are referred to as shutter glasses. Since the amount of ghost images of the shutter glasses is minimal, shutter glasses are widely used.

To ensure yield rate when manufacturing shutter glasses, a tester tests the shutter glasses before leaving a factory. In the conventional testing process, a tester wears the shutter glasses. The tester utilizes an artificial method to observe whether the operation of the shutter glasses is normal. However, the artificial method cannot effectively and quickly determine the quality of the shutter glasses.

BRIEF SUMMARY OF THE DISCLOSURE

In accordance with an embodiment, a test structure, which tests preset shutter glasses, comprises a preset display device and a testing device. The preset display device generates a synchronization signal and outputs a timing signal relating to the synchronization signal. The preset shutter glasses receive the synchronization signal to generate a masking signal. The testing device processes the timing signal and the masking signal according to a setting signal and determines whether the preset shutter glasses is normal according to the processed result.

A testing method for testing preset shutter glasses is provided. An exemplary embodiment of a testing method for testing preset shutter glasses is described in the following. A synchronization signal and a timing signal are generated. The timing signal relates to the synchronization signal. The preset shutter glasses receive the synchronization signal to generate a masking signal. The timing signal and the masking signal are processed according to a setting signal. The processed result is utilized to determine whether the preset shutter glasses are normal.

In accordance with another embodiment, a testing system comprises a preset display device, preset shutter glasses and a testing device. The preset display device generates a synchronization signal and outputs a timing signal relating to the synchronization signal. The preset shutter glasses receive the synchronization signal to generate a masking signal. The testing device processes the timing signal and the masking signal according to a setting signal and determines whether the preset shutter glasses are normal according to the processed result.

A detailed description is given in the following embodiments with reference to the accompanying drawings.

BRIEF DESCRIPTION OF THE DRAWINGS

The disclosure can be more fully understood by referring to the following detailed description and examples with references made to the accompanying drawings, wherein.

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
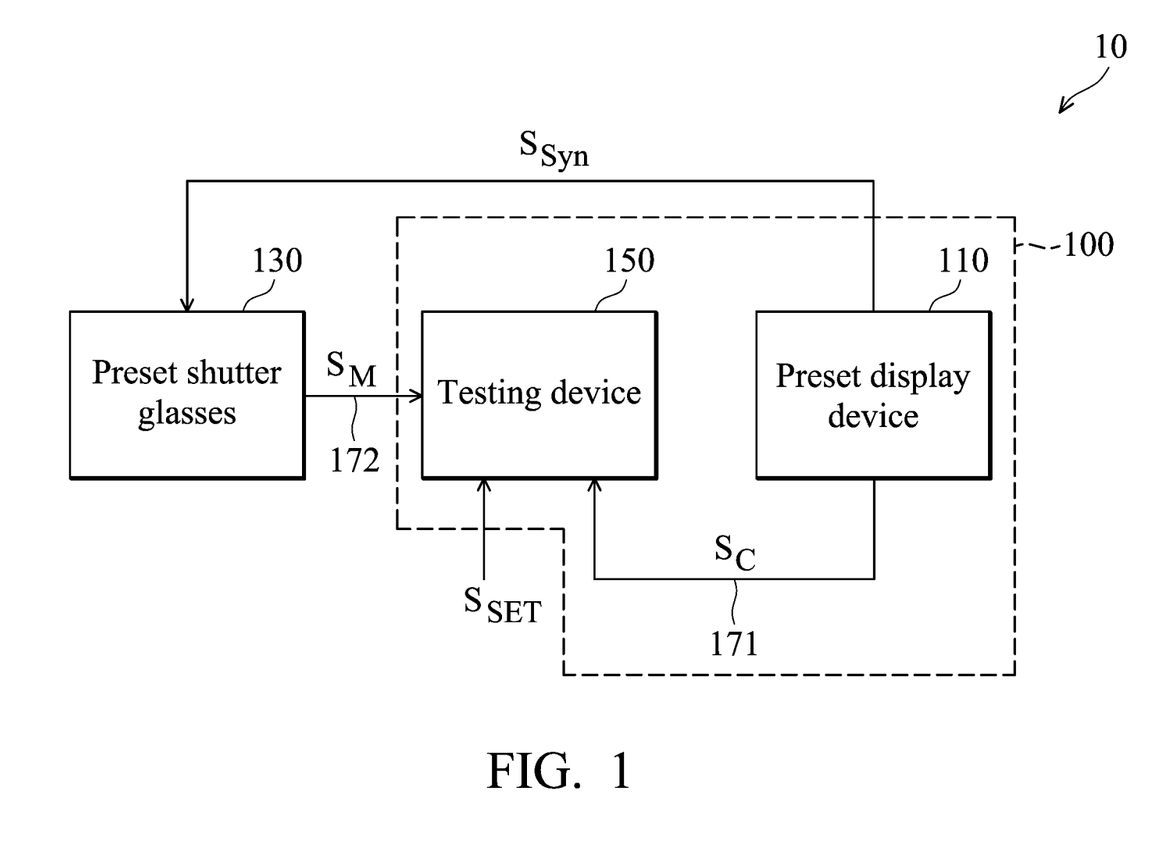
FIG. 1 is a schematic diagram of an exemplary embodiment of a testing system of the disclosure.

FIG. 1 is a schematic diagram of an exemplary embodiment of a testing system of the disclosure. The testing system 10 comprises a test structure 100 and preset shutter glasses 130. The testing structure 100 tests the preset shutter glasses 130 to determine whether the preset shutter glasses 130 are normal. In one embodiment, the testing system 10 only determines whether the preset shutter glasses 130 are normal. In another embodiment, when the preset shutter glasses 130 are abnormal, the testing system 10 can obtain and repair the abnormality. The operating configuration of the testing system 10 is described in greater detail hereafter.

In this embodiment, the testing structure 100 comprises a preset display device 110 and a testing device 150. The preset display device 110 generates a synchronization signal $S_{Syn}$ and outputs a timing signal $S_C$. The timing signal $S_C$ relates to the synchronization signal $S_{Syn}$. In one embodiment, the timing signal $S_C$ is the same as the synchronization signal $S_{Syn}$. Additionally, the disclosure does not limit the kind of the preset display device 110. In one embodiment, the preset display device 110 is a computer monitor, a notebook or a television.

The preset shutter glasses 130 receive the synchronization signal $S_{Syn}$ to generate a masking signal $S_M$. In this embodiment, the preset shutter glasses 130 utilize a wireless method to receive the synchronization signal $S_{Syn}$. The disclosure does not limit the kind of the synchronization signal $S_{Syn}$. In one embodiment, the synchronization signal $S_{Syn}$ is an Infrared Ray (IR) signal or a Radio Frequency (RF) signal.

The testing device 150 processes the timing signal $S_C$ and the masking signal $S_M$ according to a setting signal $S_{SET}$ and determines whether the preset shutter glasses 130 are normal according to the processed result. For example, when no time difference occurs between the processed timing signal and the processed masking signal, it represents that the reset shutter glasses 130 are normal. Contrarily, when a time difference occurs between the processed timing signal and the processed masking signal, it represents that the reset shutter glasses 130 are abnormal.

Since various display devices comprise different delay times, each display device does not immediately output the timing signal $S_C$. After the delay time, the display device outputs the timing signal $S_C$. The delay time may be affected by the panel characteristic or the internal tracks of the display device. Similarly, various shutter glasses comprise different delay times. Thus, each shutter glasses output the masking signal after the corresponding delay time. If a timing signal $S_C$ output from one display device is directly compared with a masking signal $S_M$ output from one shutter glasses and the corresponding delay times of the display device and the shutter glasses are not considered, an error determination may be generated.

Thus, in this embodiment, the testing device 150 stores various parameters (e.g. delay time or processing time) relating to various display devices and various shutter glasses. The testing device 150 retrieves some parameters according to a setting signal $S_{SET}$. The retrieved parameters relate to the preset display device 110 and the preset shutter glasses 130. The testing device 150 processes the timing signal $S_C$ and the masking signal $S_M$ according to the retrieved parameters to eliminate affects caused by the delay times of the present display device 110 and the preset shutter glasses 130. In one embodiment, the testing device 150 compares the processed timing signal with the processed masking signal and determines whether the preset shutter glasses 130 are normal according to the compared result. Furthermore, when the testing device 150 determines that the preset shutter glasses 130 are abnormal, the testing device 150 obtains the abnormal reason according to the compared result and then repairs the preset shutter glasses 130. The abnormal reason may be caused by hardware structure or software structure.

For example, when the testing device 150 determines that the preset shutter glasses 130 are abnormal, the testing device 150 controls the preset shutter glasses 130 to adjust the masking signal $S_M$ until no difference occurs between the processed masking signal and the processed timing signal. In one embodiment, the testing device 150 amends the programming code of the internal ROM of the preset shutter glasses 130.

In this embodiment, the testing device 150 receives the timing signal $S_C$ via a transmittal cable 171 and receives the masking signal $S_M$ via a transmittal cable 172. The disclosure does not limit the kinds of the transmittal cables 171 and 172. In one embodiment, the transmittal cables 171 and 172 are Universal Serial Bus (USB) cables. In some embodiments, the testing device 150 utilizes a wireless method to receive the timing signal $S_C$ and the masking signal $S_M$.

Additionally, the disclosure does not limit the circuit structures of the preset display device 110, the preset shutter glasses 130 and the testing device 150. Any circuit can serve as the preset display device 110, the preset shutter glasses 130 or the testing device 150; as long as the circuit is capable achieving the above function of he preset display device 110, the preset shutter glasses 130 or the testing device 150.

Figure 2:
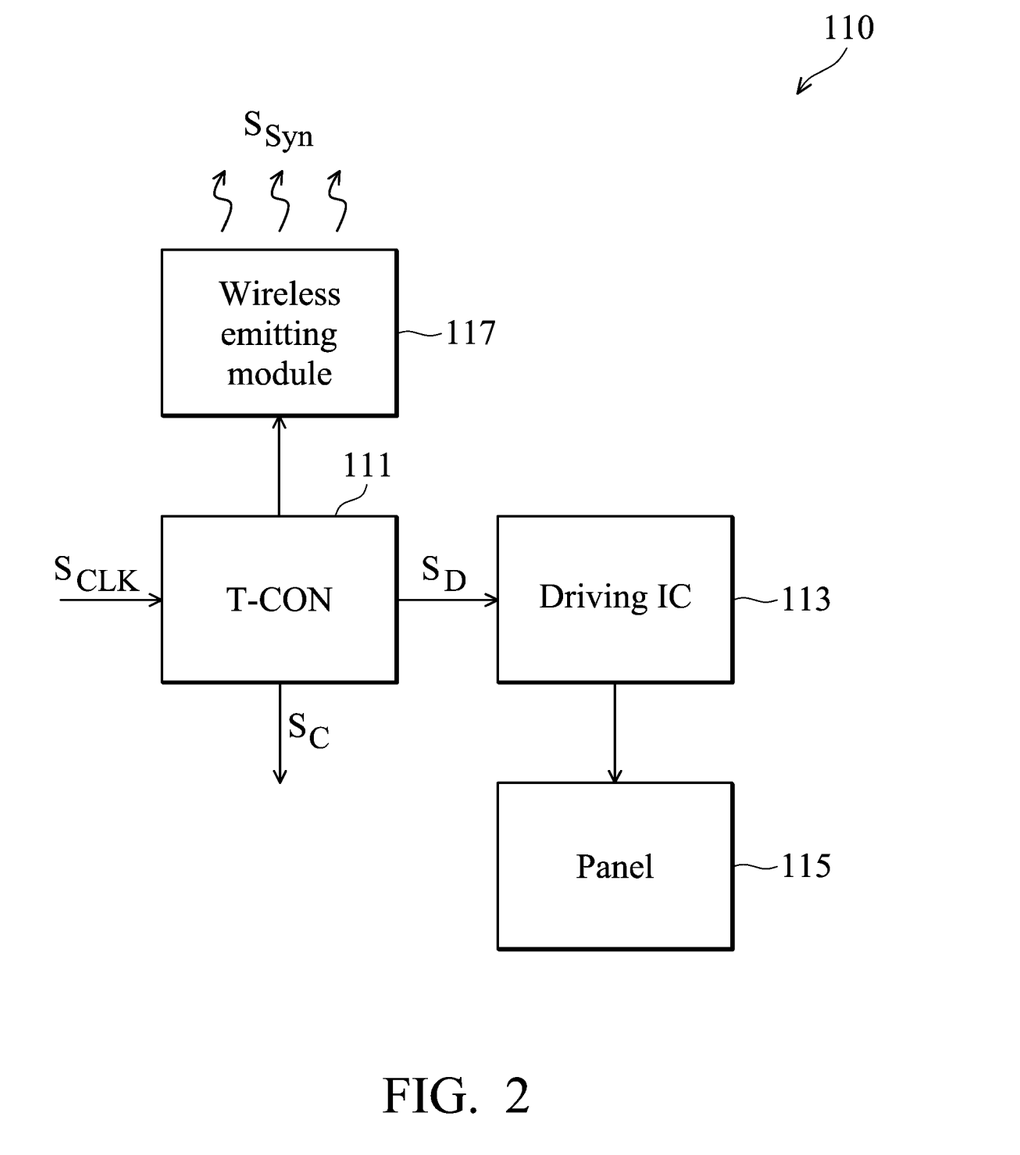
FIG. 2 is a schematic diagram of an exemplary embodiment of a display device of the disclosure.

FIG. 2 is a schematic diagram of an exemplary embodiment of a display device of the disclosure. In this embodiment, the preset display device 110 comprises a timing controller (T-CON) 111, a driving IC 113, a panel 115 and a wireless emitting module 117.

The timing controller 111 generates a timing signal $S_C$ and a driving signal $S_D$ according to a clock signal $S_{CLK}$. The driving signal $S_D$ is utilized to drive the driving IC 113. In one embodiment, the timing signal $S_C$ is the same as the driving signal $S_D$.

In this embodiment, the timing controller 111 receives the clock signal $S_{CLK}$ via one interface (not shown) and outputs the timing signal $S_C$ via another interface (not shown). The disclosure does not limit the kinds of the two interfaces. In one embodiment, a USB interface is utilized to transmit the timing signal $S_C$. In another embodiment, the clock signal $S_{CLK}$ is provided by the testing device 150, but the disclosure is not limited thereto.

The driving IC 113 controls the panel 115 according to the driving signal $S_D$ such that the panel 115 displays an image. At this time, the timing controller 111 controls the wireless emitting module 117 to output the synchronization signal $S_{Syn}$. The disclosure does not limit the kind of the wireless emitting module 117. In one embodiment, the wireless emitting module 117 is an IR emitter or a RF emitter.

Further, in this embodiment, the timing signal $S_C$ generated by the timing controller 111 is provided to the testing device 150 such that the testing device 150 can determine whether the preset shutter glasses 130 are normal according to the timing signal $S_C$, but the disclosure is not limited thereto. In other embodiments, any signal relating to the synchronization signal $S_{Syn}$ can be provided to the testing device 150 such that the testing device 150 can determine whether the preset shutter glasses 130 are normal.

For example, assuming the preset display device 110 is a computer structure. The testing device 150 determines whether the preset shutter glasses 130 are normal according to signals generated by a Graphic Processing Unit (GPU) of the computer structure. If the preset display device 110 is a television structure, the testing device 150 determines whether the preset shutter glasses 130 are normal according to signals generated by a Scalar IC of the television structure.

Figure 3:
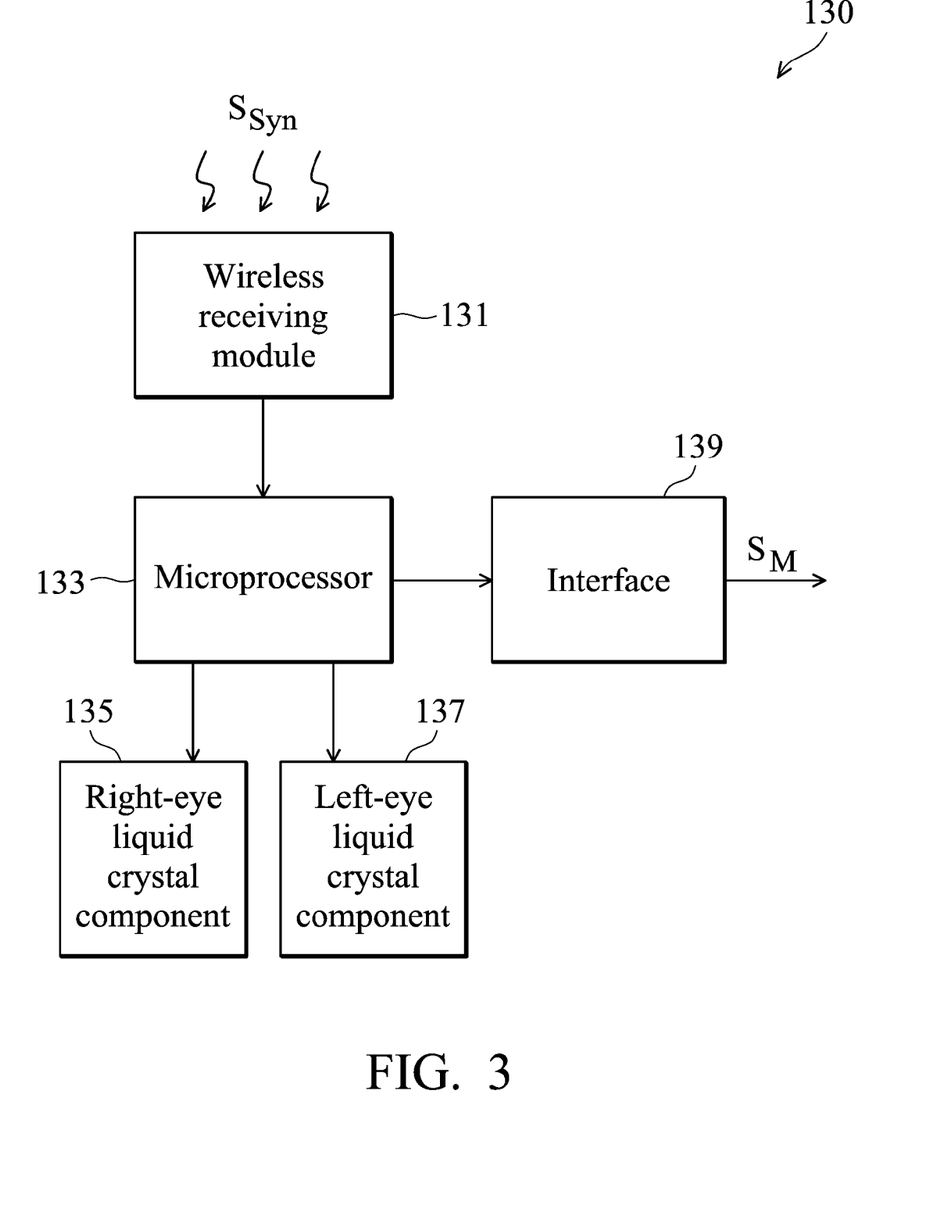
FIG. 3 is a schematic diagram of an exemplary embodiment of shutter glasses.

FIG. 3 is a schematic diagram of an exemplary embodiment of shutter glasses. The preset shutter glasses 130 comprise a wireless receiving module 131, a microprocessor 133, a right-eye liquid crystal component 135, a left-eye liquid crystal component 137 and an interface 139, but the disclosure is not limited thereto. Any glasses can serve as the preset shutter glasses 130, as long as the glasses are capable of generating a masking signal according to a synchronization signal, wherein the synchronization signal is generated by a display device and the masking signal is utilized to control the right-eye liquid crystal component 135 and the left-eye liquid crystal component 137.

The wireless receiving module 131 receives the synchronization signal $S_{Syn}$ provided by the preset display device 110 and transmits the synchronization signal $S_{Syn}$ to the microprocessor 133. The microprocessor 133 alternately controls the right-eye liquid crystal component 135 and the left-eye liquid crystal component 137 according to the synchronization signal $S_{Syn}$ such that a transparent phenomenon is achieved for the right-eye liquid crystal component 135 or the left-eye liquid crystal component 137.

In this embodiment, two phenomenons for each of the right-eye liquid crystal component 135 and the left-eye liquid crystal component 137 may appear, wherein one phenomenon is a transparent phenomenon and another phenomenon is an opaque phenomenon. When a transparent phenomenon appears for the right-eye liquid crystal component 135, an opaque phenomenon appears for the left-eye liquid crystal component 137 and vice versa. Since a user can view different images via he right-eye liquid crystal component 135 and the left-eye liquid crystal component 137, a 3D effect is produced.

In this embodiment, the microprocessor 133 outputs a masking signal $S_M$ via the interface 139. In another embodiment, the microprocessor 133 receives a control signal (not shown) via the interface 139 and adjusts the masking signal $S_M$ according to the control signal. The disclosure does not limit the kind of the interface 139. In one embodiment, the interface 139 is an USB interface. In another embodiment, the preset shutter glasses 130 further comprise a rechargeable battery (not shown). The rechargeable battery receives a charging power via the interface 139.

Figure 4:
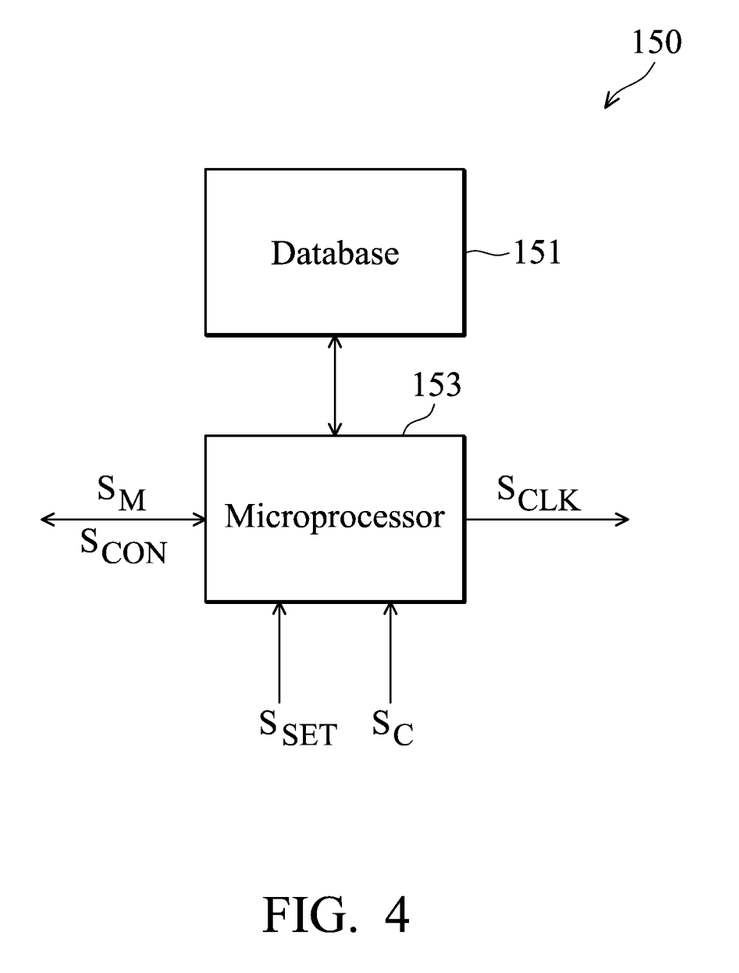
FIG. 4 is a schematic diagram of an exemplary embodiment of a testing device of the disclosure.

FIG. 4 is a schematic diagram of an exemplary embodiment of a testing device of the disclosure. In this embodiment, the testing device 150 comprises a database 151 and a microprocessor 153. The database 151 stores a plurality of first parameters and a plurality of second parameters. The first parameters relate to various display devices. The second parameters relate to various shutter glasses. In one embodiment, the database 151 is stored in a memory device.

The microprocessor 153 retrieves parameters from the database 151 according to a setting signal $S_{SET}$. The retrieved parameters correspond to the preset display device 110 and the preset shutter glasses 130. The microprocessor 153 processes the timing signal $S_C$ and the masking signal $S_M$ according to the retrieved result. Since the stored parameters relate to the delay times of the various display devices and the various shutter glasses, when the microprocessor 153 processes the timing signal $S_C$ and the masking signal $S_M$ according to the parameters stored in the database 151, the effect caused by the delay times can be solved.

The disclosure does not limit the processing method of the microprocessor 153. Assume that the microprocessor 153 retrieves a first delay time parameter and a second delay time parameter from the database 151, wherein the first delay time parameter relates to the preset display device 110 and the second delay time parameter relates to the preset shutter glasses. In one embodiment, the microprocessor 153 delays the timing signal $S_C$ to generate a first processed result according to the first delay time parameter and delays the masking signal $S_M$ to generate a second processed result according to the second delay time parameter.

In this embodiment, the microprocessor 153 compares the first and the second processed results to determine whether the preset shutter glasses 130 are normal. For example, if no time difference occurs between the first and the second processed results, it represents that the preset shutter glasses 130 are normal. Contrarily, if a time difference occurs between the first and the second processed results, it represents that the preset shutter glasses 130 are abnormal.

When the microprocessor 153 obtains that the preset shutter glasses 130 are abnormal, the microprocessor 153 provides a control signal $S_{CON}$ to the preset shutter glasses 130 to adjust the masking signal $S_M$ generated by the preset shutter glasses 130.

In one embodiment, the microprocessor 153 can auto-detect the kinds of the preset display device 110 and the preset shutter glasses 130. The detection result is served as the setting signal $S_{SET}$. In another embodiment, the setting signal $S_{SET}$ is input by a tester. The tester inputs the setting signal $S_{SET}$ according to brands or model of the preset display device 110 and the preset shutter glasses 130. Additionally, the tester utilizes the setting signal $S_{SET}$ to activate the microprocessor 153 such that the microprocessor 153 adds, deletes or amends the database 151.

Figure 5A:
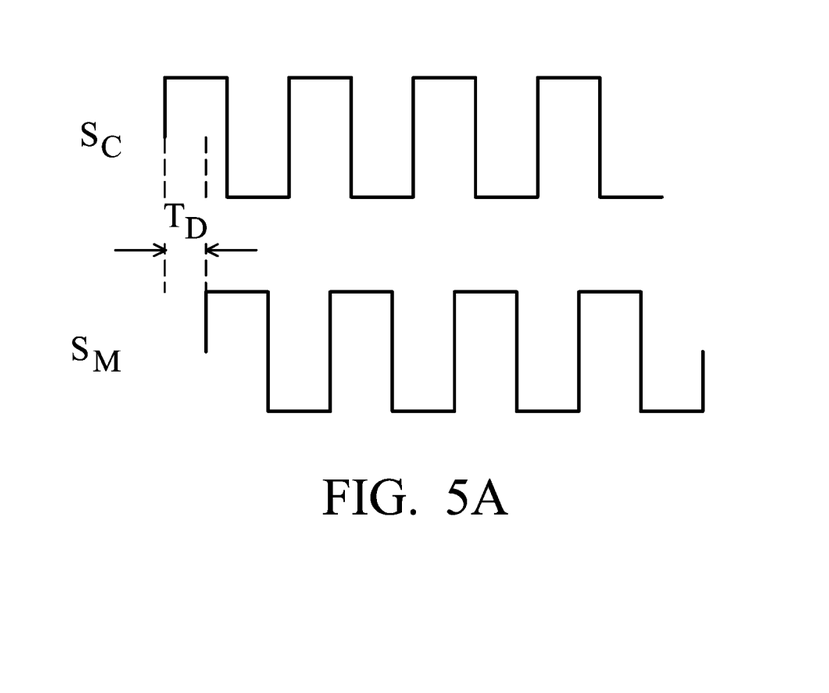
FIG. 5A is a schematic diagram of an exemplary embodiment of a timing signal and a masking signal before a microprocessor processes the timing signal and the masking signal.

FIG. 5A is a schematic diagram of an exemplary embodiment of a timing signal $S_C$ and a masking signal $S_M$ before the microprocessor 153 processes the timing signal $S_C$ and the masking signal $S_M$. A time difference $T_D$ occurs between the timing signal $S_C$ and the masking signal $S_M$. The time difference $T_D$ may be generated due to the panel characteristics or the internal tracks of the preset display device 110 and the preset shutter glasses 130. When the time difference $T_D$ occurs between the timing signal $S_C$ and the masking signal $S_M$, the testing device 150 cannot accurately determine whether the preset shutter glasses 130 are normal.

Figure 5B:
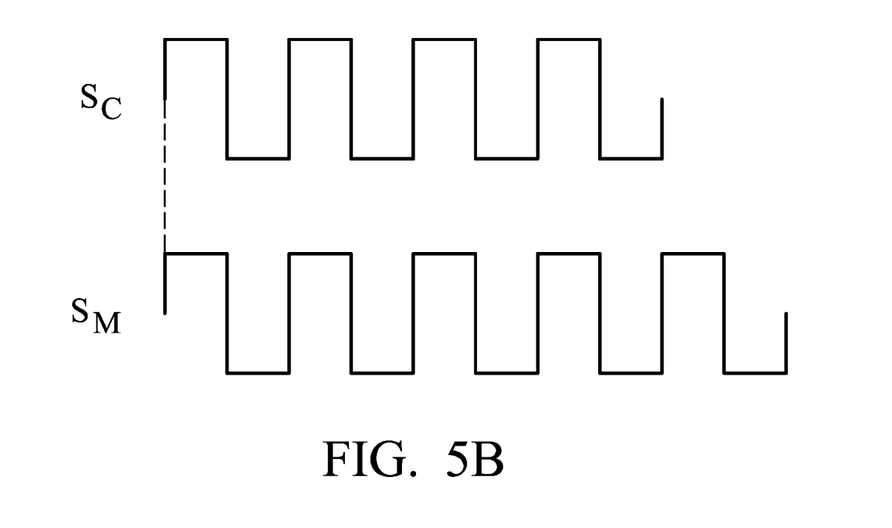
FIG. 5B is a schematic diagram of an exemplary embodiment of a processed timing signal and a processed masking signal after a microprocessor processes a timing signal and a masking signal.

To solve the delay effect of the preset display device 110 and the preset shutter glasses 130, the testing device 150 processes the timing signal $S_C$ and the masking signal $S_M$ according to the delay time parameters of the preset display device 110 and the preset shutter glasses 130. The processed result is shown in FIG. 5B. Since no time difference occurs between the processed timing signal $S_C$ and the processed masking signal $S_M$, it represents that the preset shutter glasses 130 are normal. On the contrary, if a time difference occurs between the processed timing signal $S_C$ and the processed masking signal $S_M$, it represents that the preset shutter glasses 130 are abnormal.

In one embodiment, the testing device 150 determines which element is abnormal according to the processed timing signal $S_C$ and the processed masking signal $S_M$. For example, if the odd pulse of the processed timing signal $S_C$ is different from the odd pulse of the masking signal $S_M$, it represents that the control clock of the right-eye liquid crystal component 135 is abnormal. Thus, the testing device 150 provides a corresponding control signal to control the preset shutter glasses 130 such that the preset shutter glasses 130 output a correct masking signal $S_M$.

For example and referring to FIGS. 3 and 4, when the preset shutter glasses 130 are abnormal, the testing device 150 generates a control signal $S_{CON}$ to the preset shutter glasses 130 such that the microprocessor 133 again controls the right-eye liquid crystal component 135 and the left-eye liquid crystal component 137 to again adjust the masking signal $S_M$. The testing device 150 again processes the adjusted masking signal $S_M$ to determine whether a time difference has occurred between the processed timing signal $S_C$ and the processed masking signal $S_M$. If a time difference has occurred between the processed timing signal $S_C$ and the processed masking signal $S_M$, the testing device 150 again provides a control signal to again adjust the masking signal $S_M$ until no time difference occurs between the processed timing signal $S_C$ and the processed masking signal $S_M$.

The testing system of the disclosure does not utilize a tester to wear shutter glasses to determine whether the shutter glasses are normal, thus, the accuracy of the testing procedure of the shutter glasses is increased and the testing time is reduced. Additionally, the testing system of the disclosure not only comprises a testing function, but also comprises a repair function to reduce debugging time.

Figure 6:
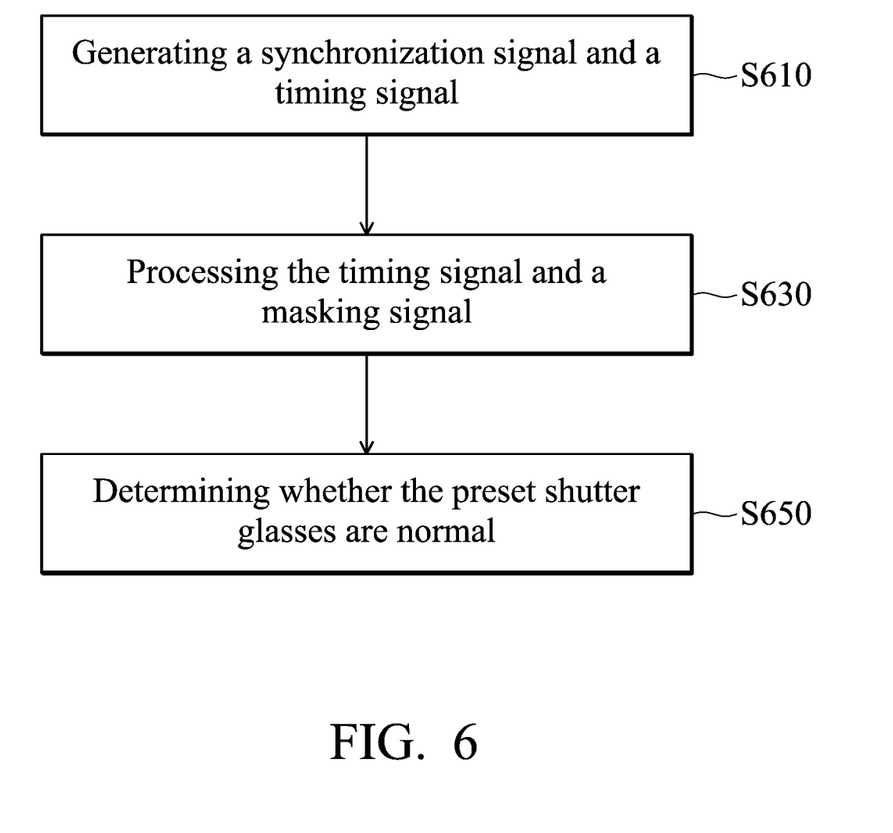
FIG. 6 is a schematic diagram of an exemplary embodiment of a testing method of the disclosure.

FIG. 6 is a schematic diagram of an exemplary embodiment of a testing method of the disclosure. The testing method tests preset shutter glasses. First, a synchronization signal and a timing signal are generated (step S610). In one embodiment, the synchronization signal and the timing signal are generated by a preset display device. In this embodiment, the timing signal relates to the synchronization signal. For example, the synchronization signal is the same as the timing signal. Further, the disclosure does not limit the kind of the synchronization signal. In one embodiment, the synchronization signal is an IR signal or a RF signal.

After receiving the synchronization signal, the preset shutter glasses generate a masking signal. Then, the timing signal and the masking signal are processed according to a setting signal (step S630). In one embodiment, the setting signal is utilized to retrieve a first delay time parameter and a second delay time parameter from a database. The first delay time parameter relates to the preset display device. The second delay time parameter relates to the preset shutter glasses. The first delay time parameter and the timing signal are processed to generate a first processed result. Further, the second delay time parameter and the masking signal are processed to generate a second processed result.

The disclosure does not limit the generation of the first and the second processed results. In one embodiment, the first delay time parameter is utilized to delay the timing signal to generate the first processed result. Additionally, the second delay time parameter is utilized to delay the masking signal to generate the second processed result.

The processed result is utilized to determine whether the preset shutter glasses are normal (step S650). In one embodiment, if no time difference occurs between the first and the second processed results obtained by step S630, it represents that the preset shutter glasses are normal. If a time difference occurs between the first and the second processed results, it represents that the preset shutter glasses are abnormal.

In other embodiments, if the preset shutter glasses are abnormal, the processed results obtained by step S630 are utilized to repair the preset shutter glasses. In one embodiment, a control signal is provided to the preset shutter glasses to adjust the masking signal generated by the preset shutter glasses. Then, the setting signal is utilized to process the timing signal and the adjusted masking signal to determine whether the preset shutter glasses are normal. The masking signal is adjusted until the preset shutter glasses are normal.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A testing structure testing preset shutter glasses, comprising:
    a preset display device generating a synchronization signal and outputting a timing signal relating to the synchronization signal, wherein the preset shutter glasses receive the synchronization signal to generate a masking signal; and
    a testing device processing the timing signal and the masking signal according to a setting signal to respectively generate a first processed result and a second processed result and determining whether the preset shutter glasses are normal according to the first and the second processed results,
    wherein when no time difference occurs between the first and the second processed results, it represents that the preset shutter glasses are normal, and when a time difference occurs between the first and the second processed results, it represents that the preset shutter glasses are abnormal.

2. The testing structure as claimed in claim 1, wherein the testing device receives the timing signal via a first interface and receives the masking signal via a second interface.

3. The testing structure as claimed in claim 1, wherein the preset display device comprises a timing controller for generating the timing signal.

4. The testing structure as claimed in claim 3, wherein the timing controller generates the timing signal according to an input clock provided by the testing device.

5. The testing structure as claimed in claim 1, wherein the preset display device comprises a wireless emitting module to emit the synchronization signal, and the preset shutter glasses comprise a wireless receiving module to receive the synchronization signal.

6. The testing structure as claimed in claim 1, wherein when the preset shutter glasses are abnormal, the testing device controls the preset shutter glasses to adjust the masking signal.

7. A testing method for testing preset shutter glasses, comprising:
    generating a synchronization signal and a timing signal relating to the synchronization signal, wherein the preset shutter glasses receive the synchronization signal to generate a masking signal;
    processing the timing signal and the masking signal according to a setting signal to respectively generate a first processed result and a second processed result; and
    determining whether the preset shutter glasses are normal according to the first and the second processed results, wherein the first processed result is compared the second processed result, when no time difference occurs between the first and the second processed results, it represents that the preset shutter glasses are normal; and when a time difference occurs between the first and the second processed results, it represents that the preset shutter glasses are abnormal.

8. The testing method as claimed in claim 7, wherein the synchronization signal is the same as the timing signal.

9. The testing method as claimed in claim 7, further comprising:
    according to the first and the second processed results, repairing the preset shutter glasses when the preset shutter glasses are abnormal.

10. The testing method as claimed in claim 9, wherein the step of according to the first and the second processed results, repairing the preset shutter glasses comprise:
    providing a control signal to the preset shutter glasses to adjust the masking signal; and
    again processing the timing signal and the adjusted masking signal according to the setting signal and determining whether the preset shutter glasses are normal according to the first and the second processed results.

11. The testing method as claimed in claim 7, wherein the timing signal, the masking signal and the synchronization signal are wireless signals.

12. A testing system, comprising:
    a preset display device generating a synchronization signal and outputting a timing signal relating to the synchronization signal;
    a preset shutter glasses receiving the synchronization signal to generate a masking signal; and
    a testing device processing the timing signal and the masking signal according to a setting signal to respectively generate a first processed result and a second processed result and determining whether the preset shutter glasses are normal according to the first and the second processed results,
    wherein when no time difference occurs between the first and the second processed results, it represents that the preset shutter glasses are normal, and when a time difference occurs between the first and the second processed results, it represents that the preset shutter glasses are abnormal.

13. The testing system as claimed in claim 12, wherein the testing device receives the timing signal via a first interface and receives the masking signal via a second interface.

14. The testing system as claimed in claim 12, wherein the preset display device comprises a timing controller for generating the timing signal.

15. The testing system as claimed in claim 14, wherein the timing controller generates the timing signal according to an input clock provided by the testing device.

16. The testing system as claimed in claim 12, wherein the preset display device comprises a wireless emitting module to emit the synchronization signal, and the preset shutter glasses comprise a wireless receiving module to receive the synchronization signal.

17. The testing system as claimed in claim 12, wherein when the preset shutter glasses are abnormal, the testing device controls the preset shutter glasses to adjust the masking signal.

\* \* \* \* \*